May 2, 1967     K. D. BEARD     3,317,406
HOT AIR DESALINIZATION APPARATUS
Filed May 1, 1963
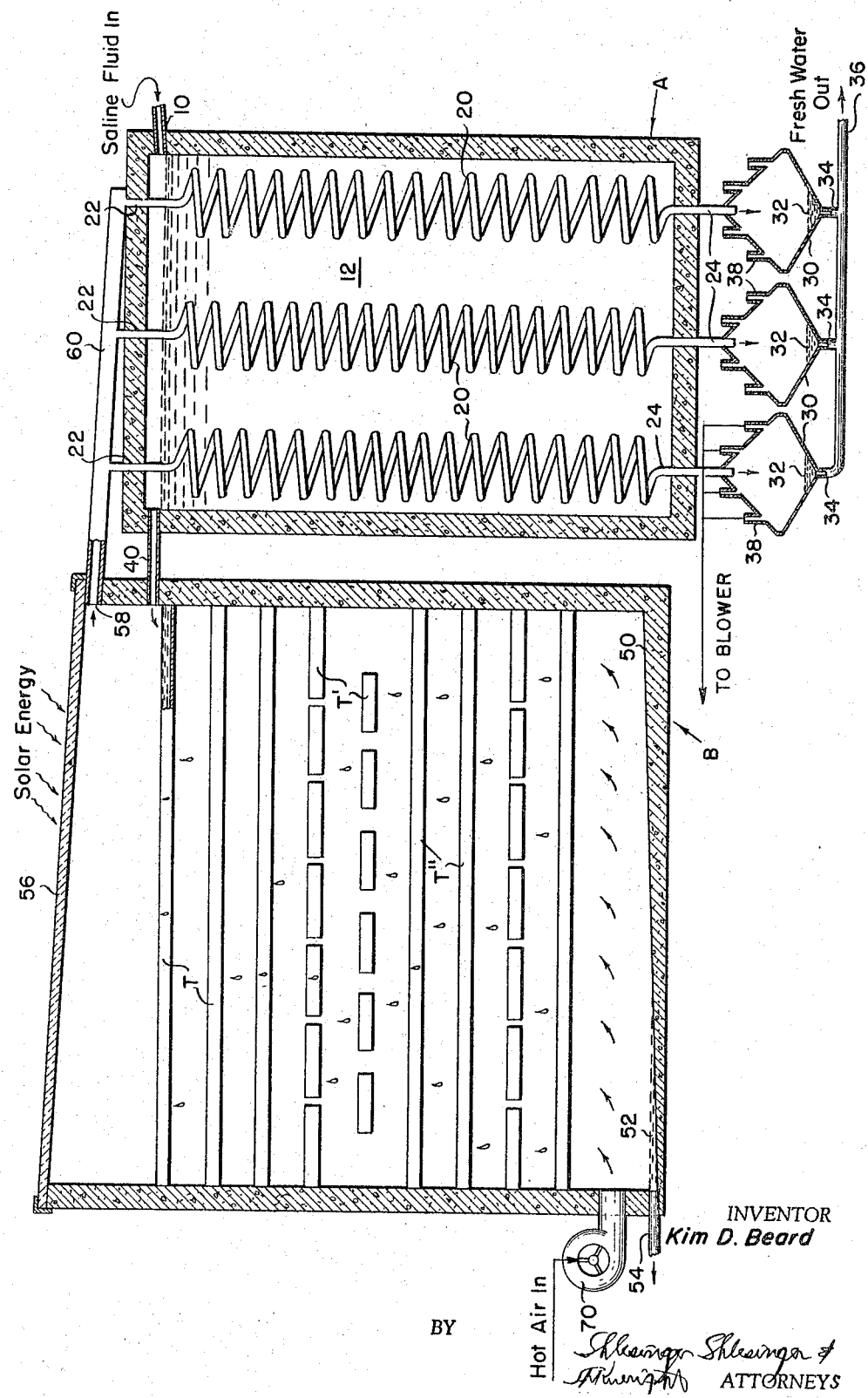
INVENTOR
*Kim D. Beard*
BY
ATTORNEYS

United States Patent Office 3,317,406
Patented May 2, 1967

3,317,406
HOT AIR DESALINIZATION APPARATUS
Kim D. Beard, 1040 S. Magnolia,
Los Angeles, Calif. 90006
Filed May 1, 1963, Ser. No. 277,372
6 Claims. (Cl. 202—180)

This invention relates to the conversion of a saline fluid to a potable state.

For the survival of man one of the most necessary staples besides food in the availability and use of water. Throughout the world there are numerous areas which are considered to be waste land since there is no supply of water available which is pure enough to be used either for drinking purposes or to be used for irrigation and the growing of food or the like. If there is a source of water available, it generally is of such an impure state or has such a high content of salt that it can not be used for any purpose at all. In the past, there have been many attempts devised to convert this water to a useful purpose by purifying it or removing or reducing its salt content. Generally, these methods employed a very complicated arrangement of heating systems, such as steam or electrical heat, to raise the temperature of the water so that it would become vaporized and then subsequently passed through a complicated arrangement to cool and condense the vapor laden air to remove the condensate which would then be water suitable for drinking and irrigation purposes. Systems and structures have also been devised which were of a more compact nature by eliminating the use of a complicated heating system and substituting a system of mirrors to utilize solar energy to raise the temperature of the water to a vapor state with subsequent cooling to obtain purified water. However, an arrangement used to employ mirrors to good advantage was generally quite complicated or the output of the system was so small that it was not economically feasible to advantageously employ the system. Systems which depended primarily upon solar energy to convert fluid were deficient in that they did not remove a satisfactory amount of the salt or the like during the first passage of the fluid through the apparatus, necessitating additional runs of the now diluted fluid which was time consuming. Further, this system could not be used in any area where there would be any sort of demand due to its meager supply and the amount of time needed to furnish that supply. Also, this system could not be readily employed within a cold region or climate. Therefore, the systems employed in the past to convert saline water to a usable state have generally been so complicated and bulky that their output does not justify the expense of converting the water or if a more compact and simplified system is used, the supply of water either cannot meet the demand or the "converted" water still has such a high saline content that it is not satisfactory and must be rerun through the system.

It is therefore an object of this invention to convert saline fluid to a potable state.

It is another object of this invention to convert the saline fluid to a potable state in an economical and expeditious manner.

It is also an object of this invention to provide for the conversion of a substantial amount of saline fluid to a potable state to satisfy the demands of the area.

It is a further object of this invention to convert saline fluid into a potable state by utilizing the natural resources of the area.

It is another object of this invention to utilize air to vaporize the saline fluid.

It is also an object of this invention to employ a hot air system to vaporize and convert the saline fluid.

It is a further object of this invention to provide basically a two part unit to convert saline fluid to a potable.

It is another object of this invention to provide for a system of converting saline fluid which may be compact and potable.

It is also an object of this invention to provide for a system of converting saline fluid which may comprise a large structural installation.

It is a further object of this invention to vaporize the saline fluid in order to purify it.

It is another object of this invention to condense the vaporized saline fluid to recover a purified fluid.

It is also an object of this invention to convey and store the purified fluid for use as desired.

It is a further object of this invention to utilize a heat exchange relationship between the saline fluid and the vaporized converted fluid.

It is another object of this invention to utilize the initial heat of the purified fluid to assist in converting the saline fluid.

It is also an object of this invention to provide for the recirculation of any unvaporized saline fluid back into the system to convert it.

It is a further object of this invention to utilize a system of trays to assist in converting the saline fluid to a potable state.

It is another object of this invention to utilize solar energy to assist in vaporizing the saline fluid.

Other objects and various further features of the invention will be pointed out or will occur to those skilled in the art from the following specification when taken into conjunction with the accompanying drawing in which:

The drawing discloses a side view of a system for the hot air conversion of saline fluid into a potable state.

The system for converting saline fluid to a potable state consists of a unit made up of two parts A and B. The basic unit may be of any size ranging from a compact portable unit to a multi-storied structural installation. The drawing discloses a multi-storied structure used to convert a substantial amount of saline fluid to a potable state by means of a hot air process. Each of the units, condenser A and evaporator B may be constructed of concrete, metal and even plastic as desired. Also, if it should be desired it is within the scope of this invention to arrange more than two parts in a systematic order to convert the saline fluid to a potable state. By way of example only two parts are illustrated as embodying the principles of the present system. Each of the units A and B is air tight and provided with a suitable lining which is resistant to the corrosion of the saline fluid or the like.

The first tank or condenser unit A is provided with an inlet 10 for the saline fluid 12 which is contained within the condenser unit. The temperature of the saline fluid as it enters the condenser unit is the natural temperature of the body of water from which it has been taken. With ocean or sea water this temperature generally is around 50 degrees F. Also provided within the condenser unit A are a plurality of vapor condensing heat exchangers shown as condensing coils 20 positioned within the body of the saline fluid contained within the condenser unit. These condensing coils 20 have generally a spiral like configuration as shown, but it is contemplated that any form may be used which would perform the function of a condensing coil. Further, these coils can be constructed of any suitable heat exchange material such as glass, plastic or any material which will not corrode easily, yet will conduct heat rapidly. Vapor laden moist hot air enters the coils 20 through the inlets 22 and flows down through the coils positioned within the saline fluid in a heat exchange relationship such that the moisture laden air is condensed.

The purified fluid exits through the coils at 24 to a chamber or vessel 30 provided adjacent the outlet 24 of the condensing coil. These distilled water collecting vessels may be formed in a conical configuration or any desired shape since the purpose of the structure is to receive the condensed fluid which is now of a substantially pure state or condition so that it may be used as desired for drinking or irrigation. Further, the distilled fluid collecting retorts are generally positioned adjacent the condenser unit A but may be placed below it such that the ground could assist in cooling the fluid. The potable water 32 is withdrawn from the condensate chamber 30 through the outlets 34 and the conduit 36 to a distribution system common within the art. The retorts or vessel are further provided with a plurality of air vents 38 to remove any of the hot air which has accumulated in the vessels 30. If desired, this hot air could be recirculated back to the system such that it may be used to assist in the vaporization of the saline fluid as it is being converted into a purified state.

There is provided within the condenser unit A an outlet 40 for the saline fluid, the temperature of which has been somewhat raised due to the heat exchange relationship between the coils 20 and the fluid contained within the tank A. The saline fluid flows out of the condenser A through the conduit 40 into the evaporator unit B. Positioned within the evaporator B are a plurality of numerous and closely juxta-positioned trays T, T', T'' supported and held in place by any suitable means. These trays may be constructed of any material which will not be corroded easily by contact with the saline fluid, such as glass, plastic, wood, compressed cardboard, etc. The manner of distributing the saline fluid from condenser A to the trays T, T', T'' through the conduit 40, may be by any means. For example, there could be a conduit provided for each row of uppermost trays T. Further, it is contemplated that there might be only one conduit which would distribute the fluid through a centrally located system to the upper most bank of trays T. The trays are rather shallow and of such a depth that fluid will flow over the sides of the trays and pass down by gravity through the receptacle B and the other trays T', T'' further provided therein. As shown there are a plurality of trays T which are arranged side by side in a stacked relationship. Further, the disposition of one row or section of trays T is designed to be angularly displaced with respect to the disposition of another section or row of trays T', T'' to provide for a continuous flow and vaporization of the fluid as it passes through the evaporator B. As shown, the section of trays T is disposed in a relationship different from that of section T'. The sections and rows of trays are alternately disposed throughout the tank B.

Any saline fluid which has not been vaporized, flows to the inclined bottom 50 of the evaporator B such that the saline fluid 52 accumulates at one section. An outlet 54 recirculates the fluid back into the system at evaporator B. If desired, a float operated or similar valve arrangement may be employed to dispense the accumulated fluid at various desired intervals.

At the upper most portion of the evaporator B is an inclined cover or top 56 made of glass or the like such that the rays of the sun will strike the fluid contained within the trays T to assist in the vaporization of the fluid while converting it to a substantially pure condition. If desired a mirror arrangement in combination with the solar rays could be utilized. The inclined nature of the roof enables any of the vaporized droplets to flow toward the outlet 58 which is provided within the upper most area of the evaporator B. The outlet 58 is for vaporized air which flows into the system 60. The system 60 distributes the moisture laden vaporized air to the inlet 22 of the condensing coils 20 where it is subsequently condensed and a purified fluid removed as desired.

Generally disposed adjacent the lower most portion of the inclined bottom 50 in evaporator B is a fan or blower 70. The fan or blower uses the hot air either from the surrounding region, as in a desert, or preheated air by any suitable means when necessary, as in a temperate or cold climate. This hot air is blown into evaporator B at the base thereof such that it flows upwardly, around and through the sections of trays. Although only one blower is shown it is within the scope of this invention that numerous blowers would be employed dependent upon the efficiency of the system. This hot air is of such a high temperature that it will contact and vaporize the saline fluid entering through conduit 40 and flowing among the tray sections to carry it off through the outlet 58 and into the system of condensing coils. Arranging the blower system adjacent the outlets 54 for the unvaporized fluid in evaporator B, and in combination with a valve system if used, assists in vaporizing portions of that fluid in order to purify it.

OPERATION

In summation, cool saline fluid flows into the condenser unit A wherein there are arranged condensing coils in heat exchange relationship with the fluid, which coils are used to condense the vaporized fluid in order to purify it. The condensed fluid is accumulated within a series of fluid collecting vessels from which it is subsequently dispensed as desired. The saline fluid flows into evaporator unit B where the tray arrangement is used to vaporize the fluid. A fan or blower is used to introduce either the hot air of the surrounding region or preheated air to collect and absorb water vapor as the air rises within evaporator B and among the tray sections. The moisture laden vaporized air is then distributed to the condensing coils of condenser unit A to purify and collect the fluid. The unvaporized fluid in evaporator B is recirculated to the trays of evaporator unit B.

While the invention has been described in connection with different embodiments thereof, it will be understood that it is capable of further modification, and this application is intended to cover any variations, uses, or adaptations of the invention following, in general the principles of the invention and including such departures from the present disclosure as come within knowing or customary practice in the art to which the invention pertains and as may be applied to the essential features here and before set forth and fall within the scope of the invention or the appended claims.

Having thus described my invention what I claim is:
1. Apparatus for obtaining a distillate comprising:
 (a) an evaporative unit having a plurality of vertically spaced rows of evaporative trays which receive and hold saline water to be distilled;
 (b) a saline water inlet at the top of said evaporative unit immediately above the top row of trays which supplies saline water to said trays so that it fills with excess water falling successively from the top to the lower most row of trays;
 (c) an excess saline water outlet at the bottom of said evaporative unit to pass out excess saline water;
 (d) a top panel above said top row of trays through which sunlight is passed;
 (e) a connecting dry air supply passage which has an open end immediately below the lowermost row of trays for passing hot air into said evaporative unit and up around said rows of trays;
 (f) a forced air unit connected to the other end of said dry air supply passage;
 (g) a warm moist air outlet immediately below said top panel and above said top row of trays through which moisture-laden air passes;
 (h) a condenser unit beside said evaporative unit which contains a body of saline water and has a liquid level over flow conduit at the side adjacent said evaporative unit for carrying saline water from the upper end of said condenser unit to said saline water inlet;

(i) a condenser unit saline water inlet above the water level in the condenser unit for supplying saline water to said condenser unit by gravity feed;

(j) a plurality of vapor condensing heat exchangers immersed in the body of water in said condenser unit and connected to said warm moist air outlet of said evaporative unit adjacent the tops thereof;

(k) each of said vapor condensing heat exchangers being connected to a collecting chamber at the lower end thereof for collecting fresh distilled water;

(l) the warm moist air passing downward through the said vapor condensing heat exchangers from top to bottom thereof, heating the adjacent water so that the water is warmed thereby rising to the liquid level over flow outlet, while the cooler water entering the condenser unit through said saline water inlet tends to sink to the bottom of the condenser unit; and (m) said chambers being vented to allow the cool air from the vapor condensing heat exchangers to pass freely through said chamber with no back pressure.

2. The apparatus for obtaining a distillate as set forth in claim 1, wherein:
   (a) successive rows of trays in the evaporative unit are disposed in different directions.

3. Apparatus for obtaining a distillate as set forth in claim 1, wherein:
   (a) said air passed through the blower to the evaporative unit is preheated.

4. Apparatus for obtaining a distillate as set forth in claim 1, wherein:
   (a) means are provided for returning air from the collecting chamber to the evaporative unit.

5. Apparatus for obtaining a distillate as set forth in claim 1, wherein:
   (a) said vapor condensing heat exchangers are condenser coils disposed vertically in said condenser unit.

6. Apparatus for obtaining a distillate as set forth in claim 1, wherein.
   (a) said evaporate unit, and said condenser unit, are large building structures.

References Cited by the Examiner

UNITED STATES PATENTS

| | | | |
|---|---|---|---|
| 102,633 | 5/1870 | Wheeler | 202—234 X |
| 430,215 | 6/1890 | Maxim | 203—49 X |
| 450,361 | 4/1891 | Baird | 202—180 X |
| 2,372,846 | 8/1942 | Nettel | 202—236 X |
| 3,210,260 | 10/1965 | Denker | 202—236 |

FOREIGN PATENTS

| | | |
|---|---|---|
| 454,558 | 9/1936 | Great Britain. |

NORMAN YUDKOFF, *Primary Examiner.*

J. B. DONIHEE, D. EDWARDS, *Assistant Examiners.*